United States Patent
Patel

(10) Patent No.: US 11,205,173 B2
(45) Date of Patent: Dec. 21, 2021

(54) SYSTEM AND METHOD FOR SECURING SENSITIVE DATA

(71) Applicant: Chevron U.S.A. Inc., San Ramon, CA (US)

(72) Inventor: Biren Arvindkumar Patel, Sam Ramon, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 192 days.

(21) Appl. No.: 16/522,309

(22) Filed: Jul. 25, 2019

(65) Prior Publication Data

US 2021/0027280 A1    Jan. 28, 2021

(51) Int. Cl.
*G06Q 20/36* (2012.01)
*G06Q 20/32* (2012.01)
*G06Q 20/34* (2012.01)

(52) U.S. Cl.
CPC ..... *G06Q 20/3672* (2013.01); *G06Q 20/3221* (2013.01); *G06Q 20/342* (2013.01); *G06Q 20/363* (2013.01)

(58) Field of Classification Search
None
See application file for complete search history.

(56) References Cited

U.S. PATENT DOCUMENTS

| | | | |
|---|---|---|---|
| 8,313,037 B1 | 11/2012 | Humphrey | |
| 8,925,826 B2 | 1/2015 | Liu et al. | |
| 9,022,285 B2 | 5/2015 | Graylin | |
| 2015/0317613 A1* | 11/2015 | Clark | G06Q 20/12 705/44 |
| 2016/0092878 A1* | 3/2016 | Radu | G06Q 20/36 |
| 2019/0392424 A1* | 12/2019 | Wilson | G06Q 20/20 |
| 2021/0081923 A1* | 3/2021 | Rafferty | G06F 21/31 |

FOREIGN PATENT DOCUMENTS

| | | | | |
|---|---|---|---|---|
| CA | 3010055 A1 * | 6/2018 | | G06Q 20/3674 |
| EP | 2 759 969 A1 * | 1/2014 | | G06Q 20/00 |

OTHER PUBLICATIONS

"Security of Mobile Payments and Digital Wallets", dated Dec. 2016, downloaded from https://www.enisa.europa.eu > fullReport, and attached as PDF file (Year: 2016).*

* cited by examiner

*Primary Examiner* — James D Nigh
*Assistant Examiner* — Margaret M Neubig
(74) *Attorney, Agent, or Firm* — King & Spalding LLP

(57) ABSTRACT

A system and method uses a cloud computing based mobile wallet application for deconstructing various elements of magnetic stripe data corresponding to a pre-paid gift card, storing such data elements in disparate secure storage devices on different networks to enhance security and reassembling the various elements to reconstruct the magnetic stripe data on demand at the time of processing a financial transaction.

20 Claims, 9 Drawing Sheets

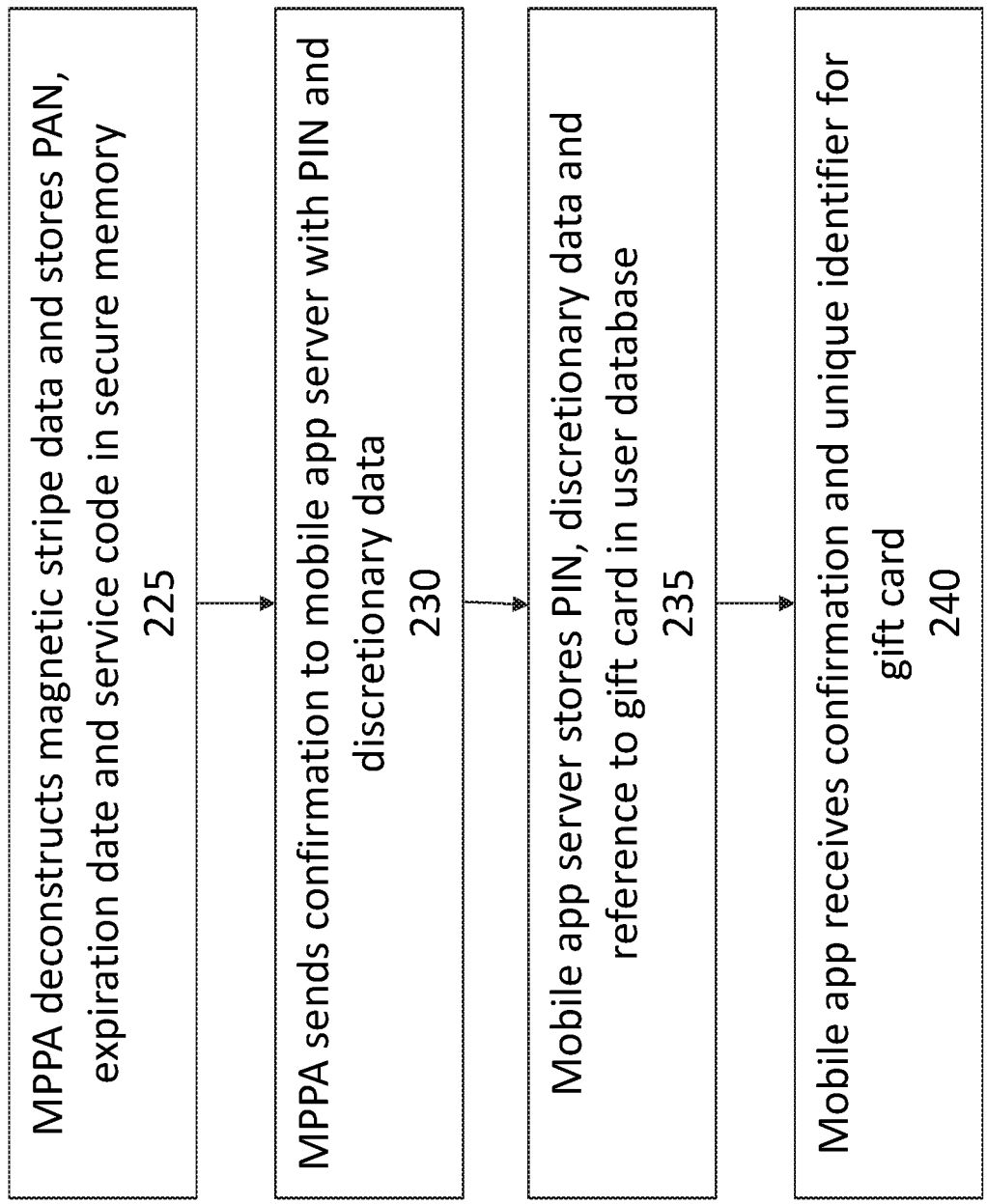

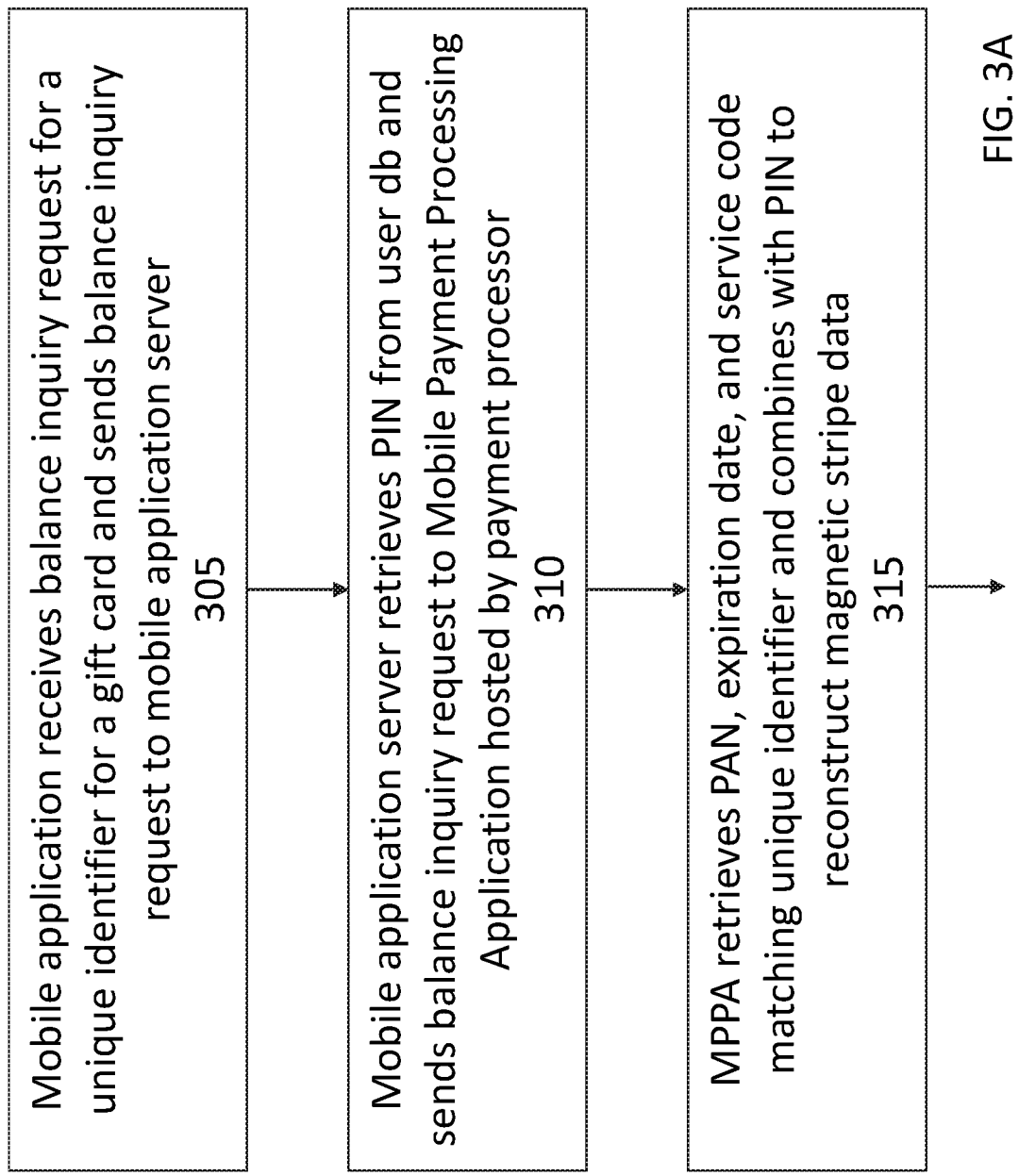

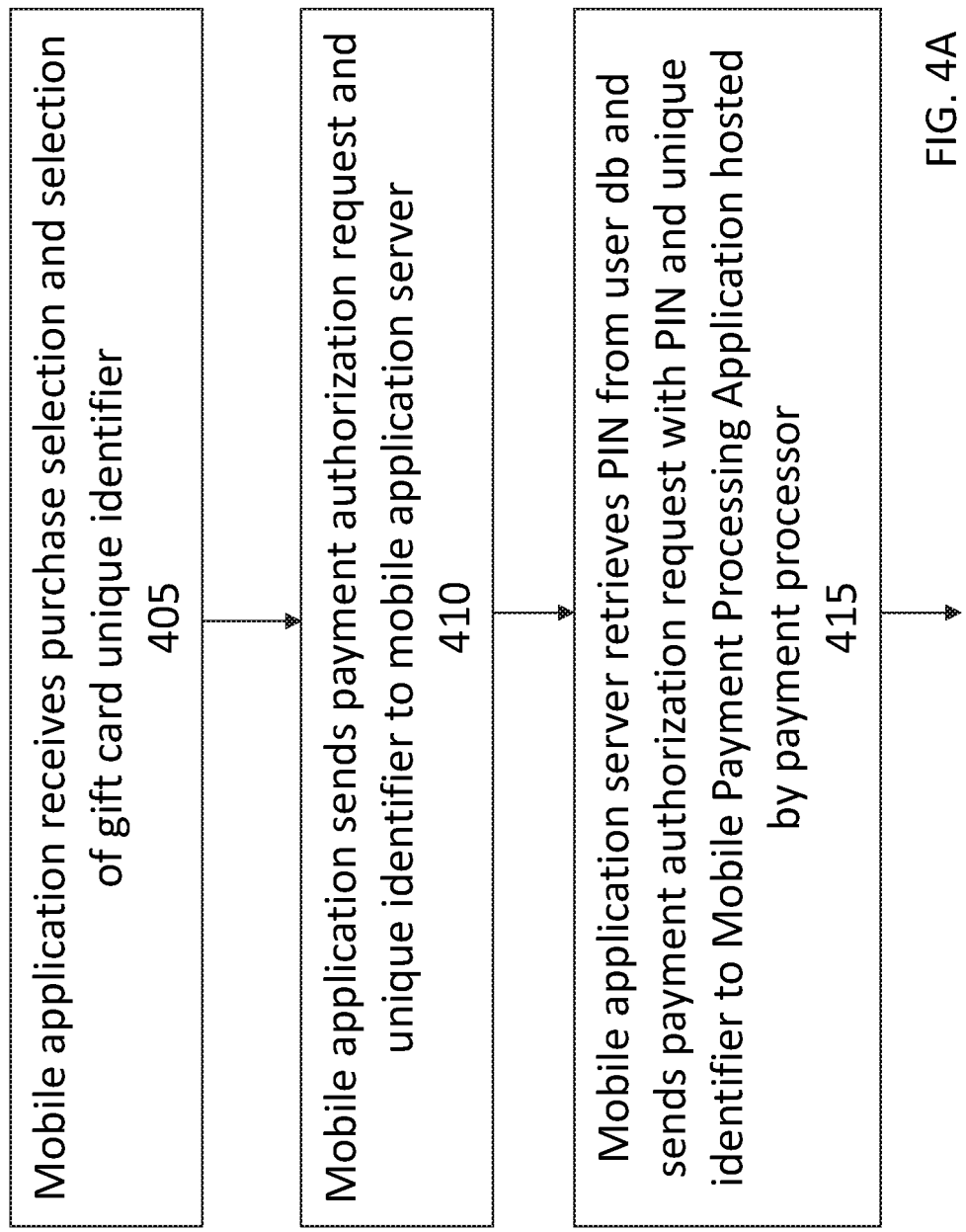

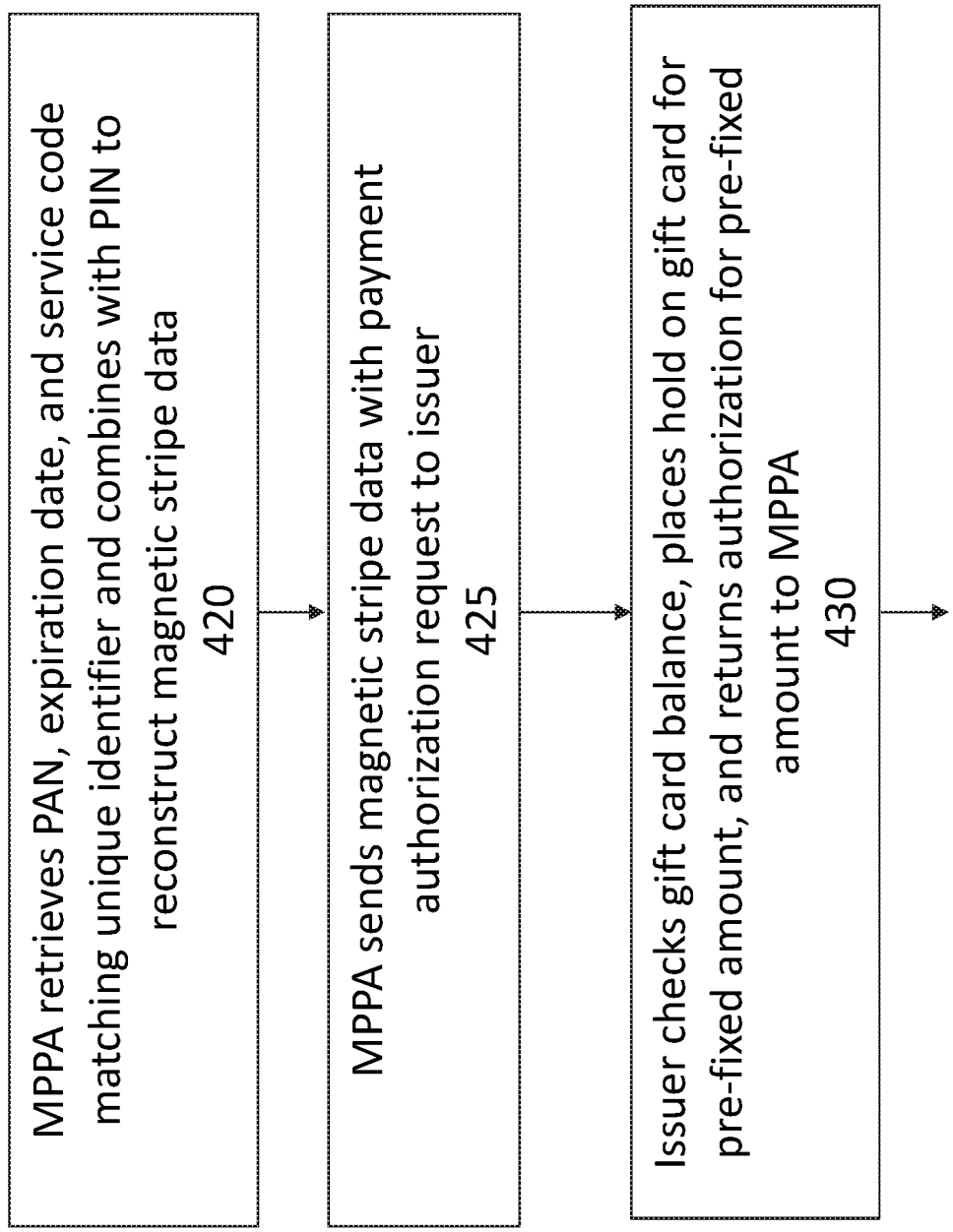

SYSTEM AND METHOD FOR SECURING SENSITIVE DATA

TECHNICAL FIELD

The present disclosure relates generally to systems, methods, and computer programs for securing sensitive data in separate electronic storage locations.

BACKGROUND

In the payment card industry, storing sensitive financial information, such as the information associated with a financial account, carries certain risks. For example, storing on a computer server the financial account information found in the magnetic stripe on a payment card presents risks in that the financial account information is available at the same time and in the same place for an individual to steal or use inappropriately. However, elements of the financial account information are needed to provision financial accounts and process financial transactions. Accordingly, techniques for more securely storing sensitive information associated with a financial account would be useful.

SUMMARY

One aspect of the present disclosure provides a computer-implemented method for securing data for provisioning a gift card. The method comprises receiving, at a mobile application server from a mobile application executing on a mobile device, a primary account number and a personal identification number associated with a gift card. The mobile application server can transmit to a payment processor server the primary account number and the personal identification number. The payment processor server can validate the primary account number and the personal identification number with the issuer of the gift card. Once validated, the payment processor server receives from the issuer magnetic stripe data associated with the gift card. The magnetic stripe data can comprise the primary account number, the personal identification number, an expiration date, and a service code associated with the gift card. The payment processor server can deconstruct the magnetic stripe data and store in the secure memory the primary account number, the expiration date, and the service code. The mobile application server can receive from the payment processor server the personal identification number. The mobile application server can store in a user database the personal identification number and a unique identifier for the gift card. Lastly, the mobile application server can transmit, to the mobile application executing on the mobile device, the unique identifier for the gift card and a confirmation that the gift card has been provisioned.

Another aspect of the present disclosure provides a computer-implemented method for securing data in association with a balance inquiry for a gift card. The method comprises receiving, at a mobile application server, the balance inquiry and a unique identifier for the gift card from a mobile application executing on a mobile device. The mobile application server can retrieve from a user database a personal identification number associated with the gift card and transmit to a payment processor server the personal identification number and the balance inquiry. The payment processor server can retrieve from a secure memory a primary account number, an expiration date, and a service code associated with the gift card to reconstruct the magnetic stripe data for the gift card. The payment processor server can transmit, to an issuer of the gift card, the magnetic stripe data and the balance inquiry. The payment processor server can receive from the issuer the balance associated with the gift card and transmit to the mobile application server the balance and the unique identifier for the gift card. The mobile application server can transmit the balance and the unique identifier to the mobile application executing on the mobile device.

Yet another aspect of the present disclosure provides a computer-implemented method for securing data in association with a transaction for a gift card. The method comprises receiving, at a mobile application server, a payment authorization request and a unique identifier for the gift card from a mobile application executing on a mobile device. The mobile application server can retrieve from a user database a personal identification number associated with the gift card and transmit to a payment processor server the personal identification number and the payment authorization request. The payment processor server can retrieve from a secure memory a primary account number, an expiration date, and a service code associated with the gift card to reconstruct the magnetic stripe data for the gift card. The payment processor server can transmit, to an issuer of the gift card, the magnetic stripe data and the payment authorization request. The payment processor server can receive a payment authorization amount associated with the gift card from the issuer and transmit the payment authorization amount to a point of sale terminal.

The foregoing aspects are example embodiments and are not meant to limit the scope of the present disclosure. These and other aspects will be described in connection with the following description and the accompanying drawings.

BRIEF DESCRIPTION OF THE DRAWINGS

FIGS. 2A and 2B are a flow chart depicting a method for securing sensitive information when provisioning a gift card in accordance with certain example embodiments.

FIGS. 3A and 3B are a flow chart depicting a method for securing sensitive information when processing a balance inquiry in accordance with certain example embodiments.

FIGS. 4A, 4B, and 4C are a flow chart depicting a method for securing sensitive information when processing a payment using a gift card in accordance with certain example embodiments.

DETAILED DESCRIPTION OF EXAMPLE EMBODIMENTS

The present disclosure relates generally to systems, methods, and computer programs for securing sensitive data in connection with a gift card. As used herein, a "gift card" can refer to a physical card containing financial account information stored in a magnetic stripe or readable memory or circuit located on or within the physical card. As used herein, a "gift card" also can refer to an electronic gift card associated with a financial account, such as for example, a unique electronic identifier stored on a mobile computing device and associated with a financial account. While the examples provided herein refer to securing sensitive financial data associated with gift cards, in alternate embodiments the techniques described herein can be applied to other types of financial accounts and other types of sensitive information.

The term "magnetic stripe data" is used herein to refer to one or more elements of data associated with a gift card that is typically stored in the magnetic stripe found on a gift card. For example, magnetic stripe data can include, but is not limited to, an account number, a personal identification number, an expiration date, and a service code. The types of data that can be included in the magnetic stripe data and the format for communicating magnetic stripe data has been standardized by the payment card industry. The personal identification number can be one or more of a PIN verification key indicator, a PIN verification value, a card verification value, and a card validation code. Although gift cards typically do not include in the magnetic stripe data the name of the customer associated with the account, in some example embodiments the name of the customer can be included in the magnetic stripe data. The term "magnetic stripe data" can be used to refer to one or more of the foregoing data elements in connection with a tangible gift card or other tangible financial card as well as an electronic gift card or other type of electronic financial card. In other words, although an electronic gift card or electronic financial card does not have a tangible magnetic stripe, the foregoing data elements associated with the electronic gift card or electronic financial card can be referred to as "magnetic stripe data".

Figure 1:
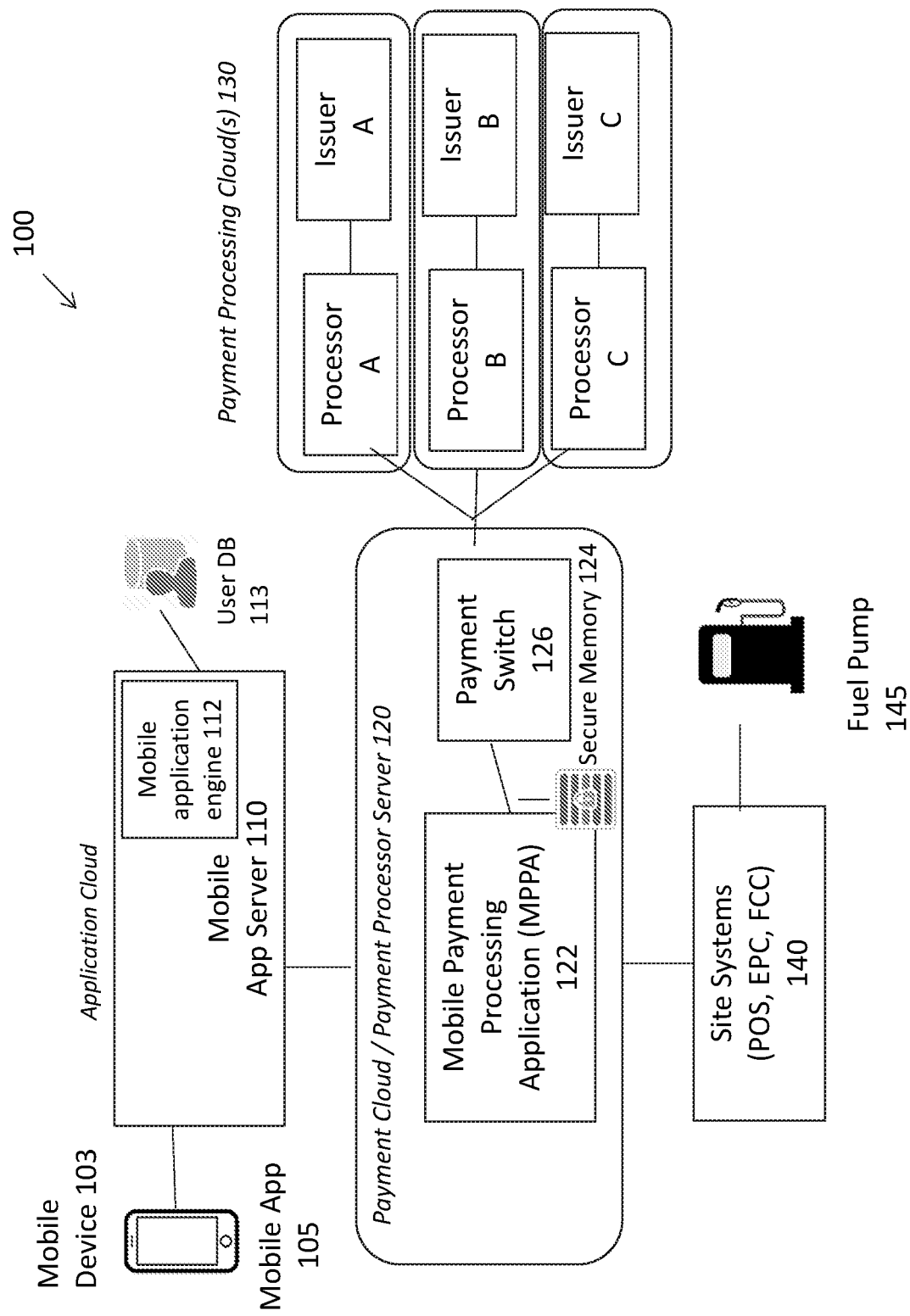
FIG. 1 is a block diagram depicting the architecture of an operating environment for securing sensitive information in accordance with certain example embodiments.

FIG. 1 illustrates the primary components of the operating environment for a payment system 100 in accordance with certain example embodiments. The payment system 100 of FIG. 1 comprises a customer mobile device 103 which interacts with a mobile application server 110 over a wireless radio communication network. A mobile application 105 is stored on and executes on the mobile device 103 and the mobile application 105 can include identifiers for various payment methods. The mobile application 105 can provide a user interface, via the mobile device 103, for receiving user input and displaying data to a user. The mobile device 103 can include a display integral or coupled to the mobile device 103. The display can provide images and information associated with a gift card to a user. The mobile application 105 transmits information to and receives information from a mobile application engine software module 112 stored on and executing on the mobile application server 110. The mobile application server 110 can be implemented as a remote server or a collection of remote computing systems in a cloud computing environment. The mobile application server 110 can securely store and retrieve data in the user database 113. In the example embodiments described herein, a retailer controls and has access to the mobile application server 110 and the user database 113.

The mobile application server 110 can communicate payment system information with the payment processor server 120 over a network that can included wired and/or wireless communication. The payment processor server 120 can be implemented as a remote server or a collection of remote computing systems in a cloud computing environment. In contrast to the mobile application server operated by the retailer, the payment processor server 120 is controlled and accessed by a payment processor service provider. Furthermore, as will be described further below in connection with the data security features, the payment processor service provider does not have access to the mobile application server and, similarly, the retailer does not have access to the payment processor server.

The payment processor server 120 comprises software implemented as a mobile payment processing application 122 (MPPA). The MPPA 122 can communicate via wired and/or wireless communication networks with the mobile application engine 112 and terminals 140 such as a point of sale terminal or an electronic payment controller located at the retailer. The terminals 140 can also communicate with the retailer's systems such as a fuel pump 145 or a checkout system. The payment processor server 120 also communicates with one or more issuers of gift cards or other financial cards or financial instruments via a payment switch 126 and a payment processor designated to interact with a particular issuer. The computing systems of the issuers can be implemented remotely in an issuer cloud computing system 130.

While certain embodiments are described in which parts of the payment system 100 are implemented in software, such as the MPPA 122, the mobile application engine 112, and the mobile application 105, it will be appreciated that one or more acts or functions of the payment system 100 may be performed by hardware, software, or a combination thereof, and may be embodied in one or more computing systems. It should be understood that the MPPA 122, the mobile application engine 112, and the mobile application 105 can include various routines, sub-routines, programs, objects, components, data structures, etc., which perform particular tasks or implement particular abstract data types While the customer is described as using mobile device 103 to interact with payment system 100, it should be understood that a variety of computing devices can be used in place of the mobile device 103, including a wearable computer, a notebook computer, a tablet computer, and a personal digital assistant.

In an example embodiment, the mobile application 105 executing on the mobile device 103 may include one or more identifiers, wherein each identifier is associated with a payment method such as a gift card. The example mobile device 103, user database 113, and secure memory 124 can include one or more tangible computer-readable storage devices. The data storage devices can be stored on or coupled to the computing devices. For example, the data storage devices can include a hard drive, a microdrive, an on-board flash memory and/or one or more removable memory cards or removable flash memory. The storage devices and their associated computer-readable media can provide non-transitory, non-volatile storage of computer-executable instructions, data structures, program modules, and other data for the payment system 100.

The example payment system 100 includes a network providing a wired or wireless communication system by which network devices (including mobile device 103, mobile application server 110, payment processor server 120, site systems 140, and issuer cloud computing system 130), can exchange data. As will be described further below, via the network, a transaction using a gift card can be communicated from the mobile device 103, to the mobile application server 110, to the payment processor server 120, to the issuer cloud 130, and to the site systems 140. In an example embodiment, the network can include one or more of a telecommunications network, a local area network (LAN), a wide area network (WAN), an intranet, an Internet, or any combination thereof. It will be appreciated that the network connections disclosed are examples and other means of establishing a communications link between the various network components can be used.

Figure 2A:
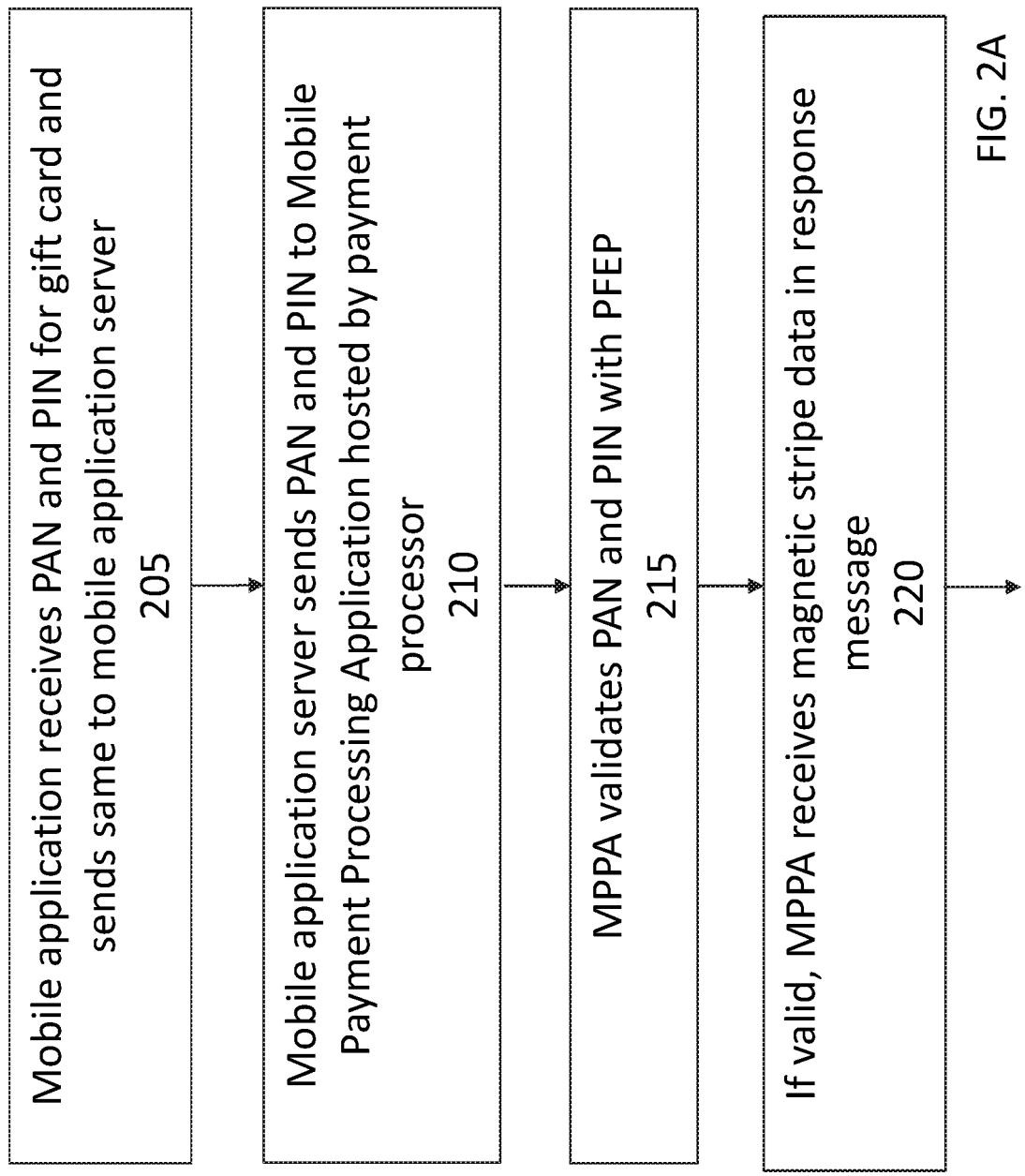

Referring now to FIGS. 2A and 2B, a flow chart is shown depicting an example method for provisioning a gift card using the example payment system 100 of FIG. 1. It should be understood that in other example embodiments, the example method of FIGS. 2A and 2B can be modified to combine certain steps, add steps, or modify the order of certain steps. Referring to step 205, the mobile application 105 receives a primary account number (PAN) and a personal identification number for a gift card. This information would typically be entered at the mobile device 103 by a user such as a customer attempting to use the gift card for a transaction. The mobile application 105 sends the primary account number and the personal identification number to the mobile application server 110. In step 210, the mobile application server 110 executing the mobile application engine 112 can send the primary account number and the personal identification number to the MPPA 122 executing on the payment processor server 120. In step 215, the MPPA 122 transmits the primary account number and the personal identification number to the gift card issuer's computing systems, such as cloud computing system 130, for validation. In certain embodiments, a payment front end processor (PFEP) can serve as an intermediary between the payment processor server 120 and the issuer computing system 130. Once the gift card issuer validates the gift card, a response message containing magnetic stripe data is transmitted from the issuer to the payment processor server 120 in step 220. As explained above, the magnetic stripe data can comprise data elements associated with the gift card including the primary account number, the personal identification number, an expiration date, and a service code. The magnetic stripe data is typically transmitted in a standardized format established by the payment card industry.

In order to securely store the primary account number and the personal identification number in separate locations for improved security, the MPPA 122 deconstructs the magnetic stripe data from its typical format and stores the primary account number, the expiration date, and the service code in secure memory 124 in step 225. In step 230, the MPPA 122 sends a confirmation message to the mobile application server 110 with the personal identification number and, optionally, any other discretionary data. The confirmation message can also comprise a identifier associated with the gift card primary account number. The identifier can be used to identify the gift card on the customer's mobile device while avoiding the security risk associated with distributing and displaying the primary account number. In step 235, the mobile application server 110 stores the personal identification number, any optional discretionary data, and the identifier for the gift card in user database 113. In the example payment system 100 illustrated in FIG. 1, the payment processor server 120 is controlled by a payment processor, whereas the mobile application server 110 is controlled by a retailer. This arrangement of storing the gift card data elements in different locations provides additional security because the retailer does not have access to the secure memory 124 associated with the payment processor server 120 and the payment processor does not have access to the user database 113 associated with the mobile application server 110. Lastly, in step 240, the mobile application 105 executing on the mobile device 103 receives confirmation that the gift card has been validated and receives the identifier for the gift card. The gift card identifier is used to look up the gift card in the user database 113 for subsequent transactions.

Figure 3B:
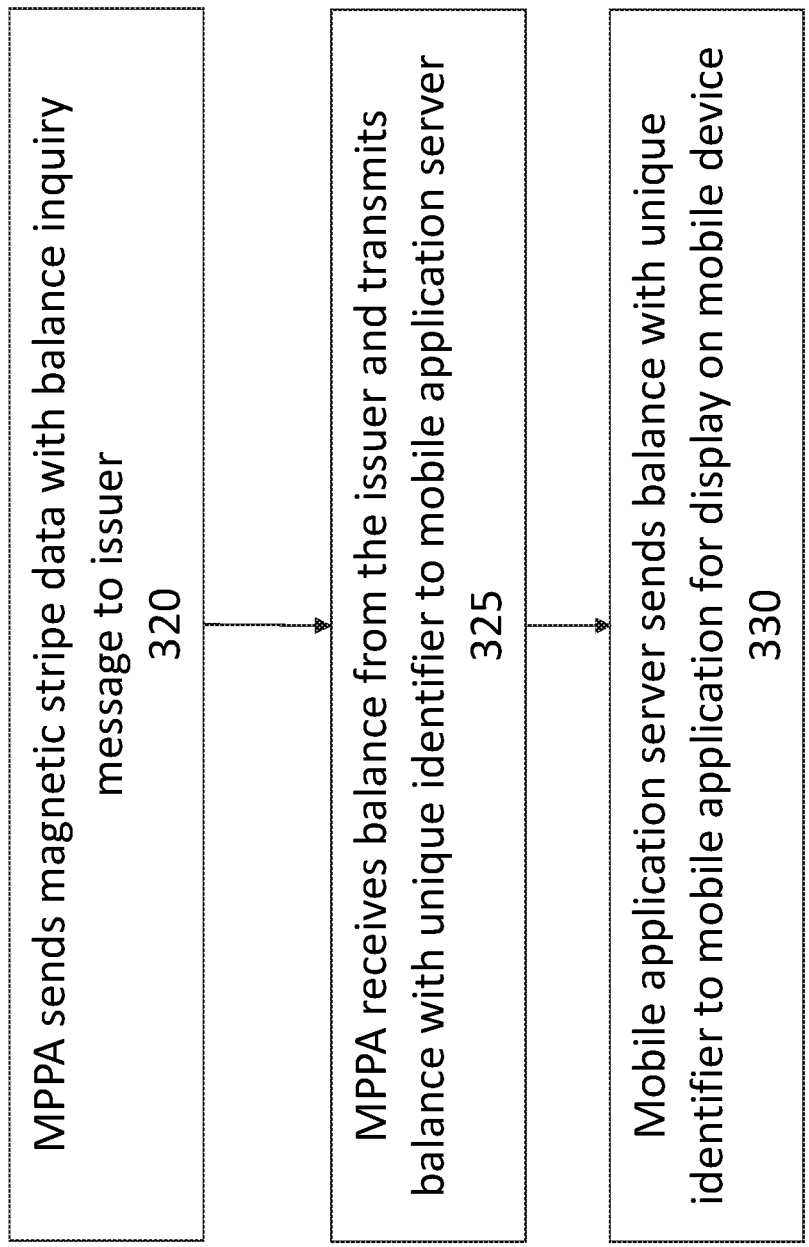

Referring now to FIGS. 3A and 3B, an example method is depicted for completing a balance inquiry transaction for the gift card using the payment system 100. It should be understood that in other example embodiments, the example method of FIGS. 3A and 3B can be modified to combine certain steps, add steps, or modify the order of certain steps. Referring to step 305, the mobile application 105 receives a balance inquiry request associated with the unique identifier for a gift card and the mobile application 105 sends the balance inquiry to mobile application server 110. For example, a balance inquiry may be initiated by a customer using the mobile device who would like to know the balance for a gift card. In step 310, the mobile application server 110 retrieves the personal identification number securely stored in the user database 113 and the mobile application server 110 forwards the balance inquiry with the identifier and the personal identification number to the MPPA 122. In step 315, the MPPA 122 retrieves the primary account number, the expiration date, and the service code associated with the identifier and the balance inquiry and combines the retrieved data elements with the personal identification number to reconstruct the magnetic stripe data. The reconstructed magnetic stripe data and the balance inquiry are sent from the MPPA 122 to the issuer in step 320 and in step 325 the MPPA 122 receives the balance from the issuer and transmits the balance with the gift card identifier to the mobile application server 110. Lastly, in step 330, the mobile application server 110 sends the balance for the gift card with the gift card identifier to the mobile application 105 for display on the mobile device 103.

Figure 4C:
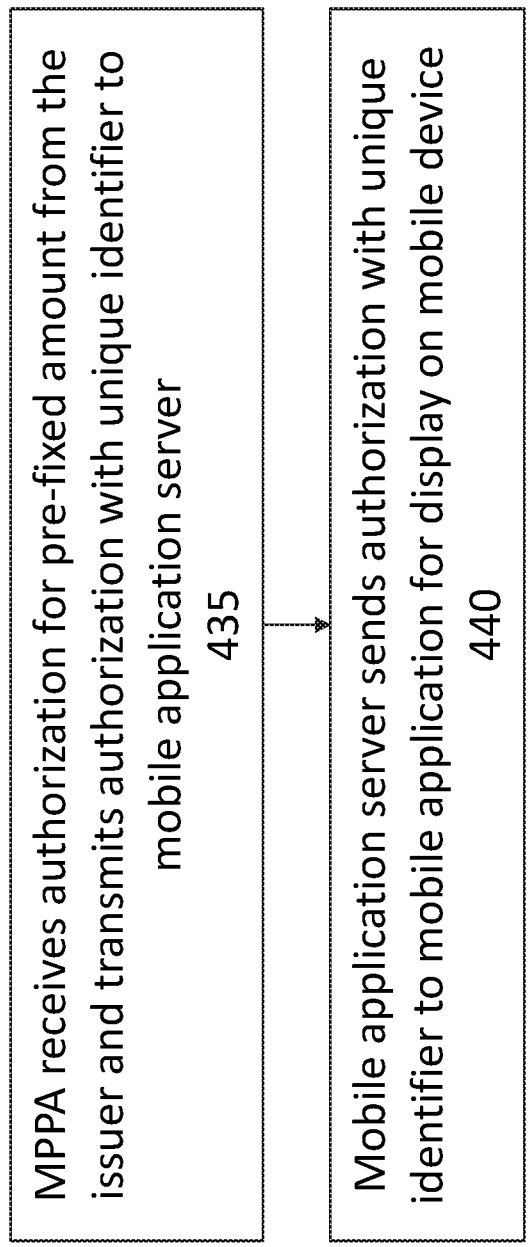

Referring now to FIGS. 4A, 4B, and 4C, an example method is depicted for completing a payment transaction with the gift card using the payment system 100. It should be understood that in other example embodiments, the example method of FIGS. 4A, 4B, and 4C can be modified to combine certain steps, add steps, or modify the order of certain steps. As an example, a payment transaction can be initiated when a customer parks a car at a fuel pump at a fueling station. The customer can launch the mobile application 105 on the mobile device 103 and the customer can enter a fuel pump identifier at the mobile application 105. In certain embodiments, the mobile device 103 can use its global positioning system to determine the location of the car and identify the fueling station and the pump for entering into the mobile application 105. Referring to step 405, the mobile application 105 receives the customer's selection of an identifier for a gift card to be used to pay for the fueling transaction. It should be understood that the payment system 100 and the method illustrated in FIGS. 4A-4C also can be used to pay for items and services other than fuel.

Referring to step 410, the mobile application 105 sends a payment authorization request and the gift card identifier to the mobile application server 110. In step 415, the mobile application engine 112 executing on the mobile application server 110 retrieves the personal identification number from the user database 113 and sends the payment authorization request with the personal identification number and the gift card identifier to the MPPA 122 executing on the payment processor server 120. In step 420, the MPPA 122 retrieves the primary account number, the expiration date, and the service code matching the gift card identifier and combines the retrieved information with the personal identification number to reconstruct the magnetic stripe data. In step 425, the MPPA 122 sends the magnetic stripe data with the payment authorization request to the issuer's computing system 130.

Referring to step 430, the issuer verifies the gift card balance, places a hold on the gift card for a pre-fixed amount, and returns authorization for the pre-fixed amount to the MPPA 122. In step 435, the MPPA 122 receives the authorization for the pre-fixed amount from the issuer and transmits the authorization with the unique identifier to the mobile application server 435. In association with step 435, the MPPA 122 can also transmit the authorization to a point of sale terminal 140 coupled to the fuel pump 145 so that they fuel pump is set to the authorized payment amount for the gift card. For example, the fuel pump identifier entered into the mobile application 105 executing on the mobile device 103 can be forwarded to the MPPA 122 so that the fuel pump can be set with the authorized payment amount. By setting the fuel pump with the authorized payment amount, the customer cannot exceed the authorized payment amount when fueling. Lastly, in step 440, the mobile application server 110 can send the payment authorization with the unique identifier to the mobile application 105 for display on the mobile device 103. Once the fueling is completed and any other items for purchase are entered into the point of sale terminal 140, the total charge can be transmitted from the point of sale terminal 140 to the MPPA 122 for forwarding to the issuer for processing the transaction against the gift card balance.

The components of the example payment system 100 have been described with reference to the example systems and methods illustrated in FIGS. 1-4C. The example embodiments can include one or more computer programs that embody the functions described herein and illustrated in the appended flow charts. However, it should be apparent that there could be many different ways of implementing aspects of the example embodiments in computer programming, and these aspects should not be construed as limited to one set of computer instructions. Further, a skilled programmer would be able to write such computer programs to implement example embodiments based on the flow charts and associated description in the application text. Therefore, disclosure of a particular set of program code instructions is not considered necessary for an adequate understanding of how to make and use the example embodiments. Further, those skilled in the art will appreciate that one or more acts described may be performed by hardware, software, or a combination thereof, as may be embodied in one or more computing systems.

It is contemplated that the mobile device 103, the mobile application server 110, the payment processor server 120, and the issuer cloud computing environment 130 may also include one or more similar computer system components. Those having ordinary skill in the art having the benefit of the present disclosure will appreciate that the foregoing payment network components can have any of several other suitable computer system configurations.

The example embodiments described herein can be used with computer hardware and software that perform the methods and processing functions described previously. The systems, methods, and procedures described herein can be embodied in a programmable computer, computer-executable software, or digital circuitry. The software can be stored on tangible computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 5:
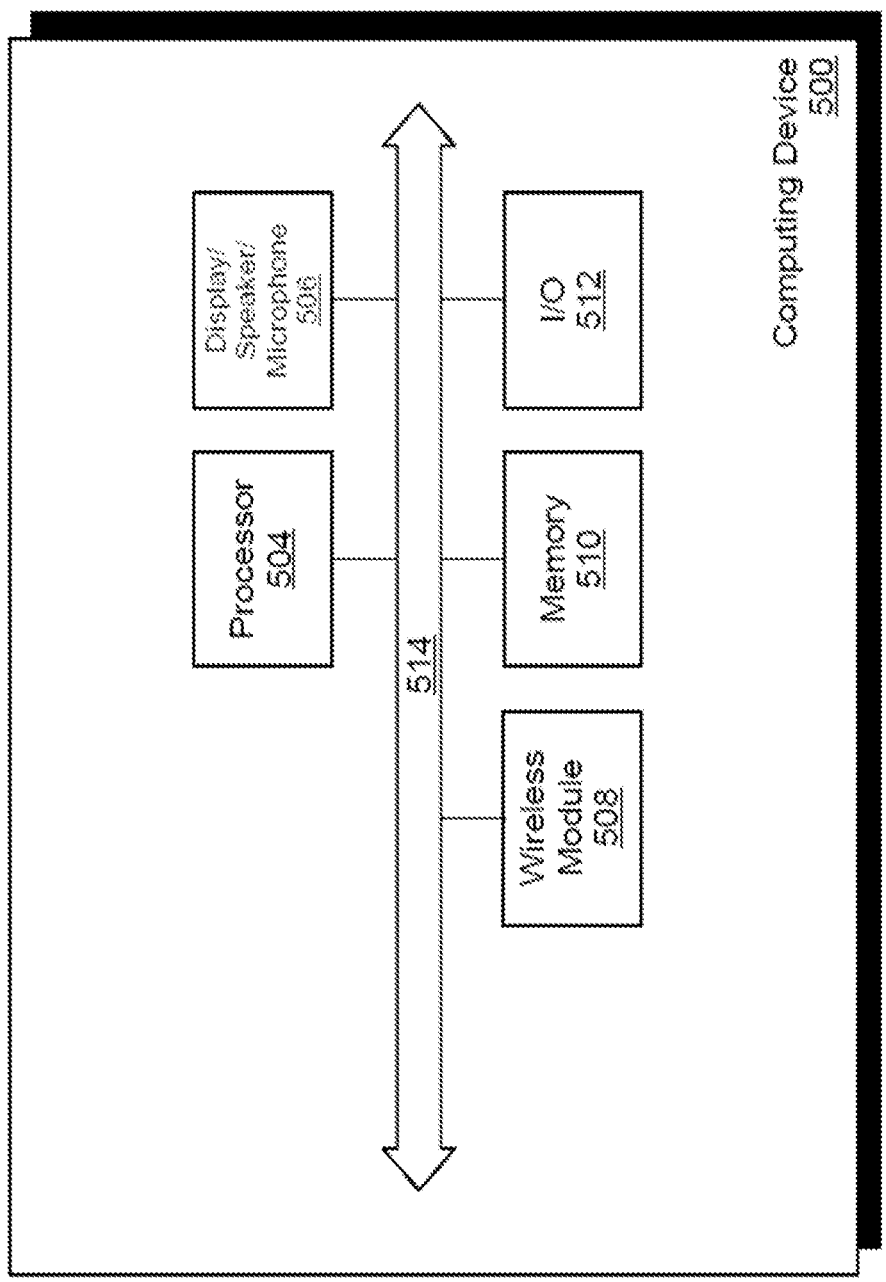
FIG. 5 is an example embodiment of a functional block diagram of a computing device.

FIG. 5 illustrates an example block diagram of a computing device 500 such as the mobile computing devices and server computing devices described previously. As illustrated in FIG. 5, the computing device includes a hardware processor 504, display/speaker/microphone 506, wireless module 508, memory 510, and I/O 512. In FIG. 5, elements of the computing device 500 are electrically and communicatively interconnected via a bus 514.

The processor 504 may comprise one or more specific or general purpose processors configured to execute instructions stored on the memory 510 that, when executed, control the processor 504 to execute various applications and perform various functions associated with the computing device 500. Additionally or alternatively, the processor 504 may include a programmable gate array and operate, at least in part, based on firmware. As an example, the processor 504 may execute instructions stored on the memory 510 including instructions for an operating system of the computing device 500 and instructions for applications. The applications that may be executed by the computing device 500 include mobile applications and engines, mobile payment processing applications, an electronic wallet application, an e-mail application, a map viewer application, a web-browser application, and a mobile phone application, among others. The input commands control applications executing on the computing device 500 to perform various tasks or functions associated with the applications.

The display/speaker/microphone 506 is configured to display applications executing on the processor 504 and provide visual and audible feedback to a user of the computing device 500. To that end, the display/speaker/microphone 506 may comprise one or more display devices such as LCD, LED, OLED, and Electronic Ink displays, among others. The display/speaker/microphone 506 may also comprise one or more speakers and one or more microphones.

The wireless communication module 508 is configured to provide wireless communication of data to and from the computing device 500. As a non-limiting group of examples, the wireless communication module 508 may be configured for cellular communications using one or more of GSM, CDMA, TDMA, OFDM and other cellular communications protocols, wireless area network communications using one or more of the family of 802.11x protocols and other wireless area network communications protocols, and Bluetooth communications protocols.

The memory 510 may comprise a Random Access Memory (RAM), Read Only Memory (ROM), or any other tangible storage memory configured to store software programs for execution by the processor 504. As a non-limiting example group, the memory 510 may comprise one or more of dynamic, persistent, and semi-persistent solid state memories, magnetic memories, removable memories, or any other known memories suitable for the application of storing data and software programs for the computing device 500.

The I/O 512 includes inputs and outputs of the computing device 500 such as power connectors, data connectors, and other input and output devices. The I/O 512 may comprise, for example, wired data communication input and output interfaces, power charging interfaces, infra-red interfaces, light and proximity sensors, capacitive sensors, "soft" and "hard" buttons, switches, and other input/output interfaces of the computing device 500. The bus 514 is configured to electrically and communicatively connect the processor 504, the display/speaker/microphone 506, the wireless module 508, the memory 510, and the I/O 512 for transfer of data and instructions between elements of the computing device 500.

The example methods and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for securing data in association with provisioning a gift card comprising:
   receiving, at a mobile application server, a primary account number and a personal identification number from a mobile application executing on a mobile device;
   transmitting, from the mobile application server to a payment processor server, the primary account number and the personal identification number;
   validating, by the payment processor server, the primary account number and the personal identification number with an issuer of the gift card;
   receiving, at the payment processor server from the issuer, magnetic stripe data associated with the gift card, the magnetic stripe data comprising: the primary account number, the personal identification number, an expiration date, and a service code;
   deconstructing the magnetic stripe data, by the payment processor server, and storing in a secure memory the primary account number, the expiration date, and the service code;
   receiving, at the mobile application server from the payment processor server, the personal identification number;
   storing, by the mobile application server in a user database, the personal identification number and a unique identifier for the gift card; and
   transmitting, to the mobile application executing on the mobile device, a confirmation that the gift card has been provisioned and the unique identifier for the gift card.

2. The method of claim 1, wherein the mobile application server is operated by a retailer.

3. The method of claim 2, wherein the payment processor server is operated by a payment processor.

4. The method of claim 3, wherein the retailer does not have access to the secure memory and wherein the payment processor does not have access to the user database.

5. The method of claim 1, wherein the primary account number, the expiration date, and the service code are stored in the secure memory only after the payment processor server validates the primary account number and the personal identification number with the issuer.

6. The method of claim 1, wherein the personal identification number is stored in the user database only after the payment processor server validates the primary account number and the personal identification number with the issuer.

7. The method of claim 1, wherein the mobile application server comprises a mobile application engine.

8. The method of claim 1, wherein the payment processor server comprises a mobile payment processing application.

9. A method for securing data in association with a balance inquiry for a gift card comprising:
   receiving, at a mobile application server, a balance inquiry and a unique identifier for the gift card from a mobile application executing on a mobile device;
   retrieving, at the mobile application server from a user database, a personal identification number associated with the gift card;
   transmitting, from the mobile application server to a payment processor server, the personal identification number and the balance inquiry;
   retrieving, at the payment processor server from a secure memory, a primary account number, an expiration date, and a service code associated with the gift card to reconstruct the magnetic stripe data for the gift card;
   transmitting, from the payment processor server to an issuer of the gift card, the magnetic stripe data and the balance inquiry;
   receiving, at the payment processor server from the issuer, a balance associated with the gift card;
   transmitting, from the payment processor server to the mobile application server, the balance and the unique identifier for the gift card; and
   transmitting, from the mobile application server to the mobile application executing on the mobile device, the balance and the unique identifier for the gift card.

10. The method of claim 9, wherein the mobile application server is operated by a retailer.

11. The method of claim 9, wherein the payment processor server is operated by a payment processor.

12. The method of claim 11, wherein the retailer does not have access to the secure memory and wherein the payment processor does not have access to the user database.

13. The method of claim 9, wherein the payment processor server does not store the personal identification number in the secure memory.

14. A method for securing data in association with a transaction for a gift card comprising:
   receiving, at a mobile application server, a payment authorization request and a unique identifier for the gift card from a mobile application executing on a mobile device;
   retrieving, at the mobile application server from a user database, a personal identification number associated with the gift card;
   transmitting, from the mobile application server to a payment processor server, the personal identification number and the payment authorization request;
   retrieving, at the payment processor server from a secure memory, a primary account number, an expiration date, and a service code associated with the gift card to reconstruct magnetic stripe data for the gift card;
   transmitting, from the payment processor server to an issuer of the gift card, the magnetic stripe data and the payment authorization request;
   receiving, at the payment processor server from the issuer, a payment authorization amount associated with the gift card; and
   transmitting, from the payment processor server to a point of sale terminal, the payment authorization amount associated with the gift card.

15. The method of claim 14, wherein the point of sale terminal is coupled to a fuel pump.

16. The method of claim 15, wherein the mobile application executing on the mobile device receives location information for the fuel pump.

17. The method of claim 15, wherein the mobile application executing on the mobile device receives a fuel pump identifier for the fuel pump.

18. The method of claim 14, further comprising:
   transmitting, from the payment processor server to the mobile application server, the payment authorization amount and the unique identifier for the gift card; and
   transmitting, from the mobile application server to the mobile application executing on the mobile device, the payment authorization amount and the unique identifier for the gift card.

19. The method of claim 14, wherein the mobile application server is operated by a retailer and the payment processor server is operated by a payment processor.

20. The method of claim 14, wherein the payment processor server does not store the personal identification number in the secure memory.

* * * * *